US00RE48977E

(19) United States
(12) Reissued Patent
Serrano et al.

(10) Patent Number: US RE48,977 E
(45) Date of Reissued Patent: Mar. 22, 2022

(54) GROOVES OF GOLF CLUB HEADS AND METHODS TO MANUFACTURE GROOVES OF GOLF CLUB HEADS

(71) Applicant: KARSTEN MANUFACTURING CORPORATION, Phoenix, AZ (US)

(72) Inventors: Anthony D. Serrano, Phoenix, AZ (US); Paul D. Wood, Phoenix, AZ (US); Bradley D. Schweigert, Cave Creek, AZ (US); Calvin S. Wang, Chandler, AZ (US); John A. Solheim, Phoenix, AZ (US)

(73) Assignee: Karsten Manufacturing Corporation, Phoenix, AZ (US)

(21) Appl. No.: 16/986,103

(22) Filed: Aug. 5, 2020

Related U.S. Patent Documents

Reissue of:
(64) Patent No.: 9,108,088
Issued: Aug. 18, 2015
Appl. No.: 13/628,685
Filed: Sep. 27, 2012

U.S. Applications:
(63) Continuation-in-part of application No. 13/591,620, filed on Aug. 22, 2012, now Pat. No. 8,764,578, (Continued)

(51) Int. Cl.
*A63B 53/04* (2015.01)
*A63B 60/00* (2015.01)

(52) U.S. Cl.
CPC ..... *A63B 53/04* (2013.01); *A63B 53/047* (2013.01); *A63B 53/0466* (2013.01); *A63B 53/0487* (2013.01); *A63B 60/00* (2015.10); *A63B 53/0408* (2020.08); *A63B 53/0416* (2020.08); *A63B 53/0445* (2020.08); *Y10T 29/49* (2015.01); *Y10T 29/49995* (2015.01)

(58) Field of Classification Search
CPC . A63B 53/0466; A63B 53/04; A63B 53/0487; A63B 53/047; A63B 60/00; A63B 53/0445; A63B 53/0408; A63B 53/0416; Y10T 29/49; Y10T 29/49995
See application file for complete search history.

(56) References Cited

U.S. PATENT DOCUMENTS 1,854,548 A 4/1932 Hunt
3,659,855 A 5/1972 Hardesty
(Continued)

FOREIGN PATENT DOCUMENTS

CA 2196025 A1 * 12/1997 ..... A63B 53/0487
CA 2745552 A1 * 9/2012
(Continued)

OTHER PUBLICATIONS

International Search Report and Written Opinion dated Jan. 14, 2016 for PCT Application No. PCT/US2015/058127, filed Oct. 29, 2015.

(Continued)

*Primary Examiner* — Jeffrey R Jastrzab

(57) ABSTRACT

Embodiments of grooves of golf club heads and methods to manufacture grooves of golf club heads are generally described herein. Other embodiments may be described and claimed.

21 Claims, 10 Drawing Sheets

Related U.S. Application Data which is a continuation of application No. 13/237,293, filed on Sep. 20, 2011, now Pat. No. 8,282,505, which is a continuation of application No. 12/535,868, filed on Aug. 5, 2009, now Pat. No. 8,066,586.

(60) Provisional application No. 61/697,994, filed on Sep. 7, 2012, provisional application No. 61/541,981, filed on Sep. 30, 2011, provisional application No. 61/087,158, filed on Aug. 7, 2008.

(56) References Cited

U.S. PATENT DOCUMENTS

D240,949 S 8/1976 Jones
4,508,349 A 4/1985 Gebaur et al.
4,550,914 A 11/1985 McCallister
4,749,197 A 6/1988 Orlowski
4,753,440 A 6/1988 Chorne
4,792,140 A 12/1988 Yamaguchi et al.
4,858,929 A 8/1989 Long
4,884,808 A 12/1989 Retzer
4,988,104 A * 1/1991 Shiotani et al. ..... 473/305
5,090,702 A * 2/1992 Viste ..... 473/331
5,141,231 A 8/1992 Cox
5,255,918 A 10/1993 Anderson et al.
5,282,624 A 2/1994 Viste
5,354,059 A 10/1994 Stuff
5,358,249 A 10/1994 Mendralla
5,417,419 A * 5/1995 Anderson et al. ..... 473/329
5,423,535 A 6/1995 Shaw
5,458,332 A 10/1995 Fisher
5,472,201 A * 12/1995 Aizawa et al. ..... 473/329
5,505,450 A 4/1996 Stuff
5,531,439 A 7/1996 Azzarella
5,591,092 A 1/1997 Gilbert
5,601,501 A 2/1997 Kobayashi
5,611,742 A 3/1997 Kobayashi
5,618,239 A 4/1997 Rife
5,643,099 A 7/1997 Solheim
5,676,605 A 10/1997 Kobayashi
5,688,186 A 11/1997 Michaels et al.
5,690,561 A 11/1997 Rowland et al.
5,709,616 A 1/1998 Rife
5,709,617 A 1/1998 Nishimura et al.
5,711,722 A 1/1998 Miyajima et al.
5,735,755 A 4/1998 Kobayashi
5,755,626 A 5/1998 Shira
5,762,566 A 6/1998 King et al.
5,766,087 A 6/1998 Kawamatsu
5,785,610 A * 7/1998 Birmingham ..... A63B 53/04 473/331
5,967,903 A * 10/1999 Cheng ..... 473/342
6,224,497 B1 5/2001 Antonious
6,322,459 B1 11/2001 Nishimura et al.
6,336,869 B1 1/2002 Hettinger
6,398,665 B1 6/2002 Antonious
6,406,379 B1 6/2002 Christensen
6,478,690 B2 11/2002 Helmstetter
6,488,594 B1 12/2002 Card
D481,432 S 10/2003 Greene
6,710,287 B2 3/2004 Lu
6,719,644 B2 4/2004 Erb et al.
6,719,645 B2 4/2004 Kouno
D490,129 S 5/2004 Greene
6,743,117 B2 6/2004 Gilbert
6,875,124 B2 4/2005 Gilbert
7,018,303 B2 3/2006 Yamamoto
7,056,226 B2 6/2006 Kennedy
7,066,833 B2 6/2006 Yamamoto
7,101,290 B2 9/2006 Tucker, Sr. et al.
7,163,467 B1 1/2007 Chang et al.
7,179,175 B2 2/2007 Jennedy, III
7,261,644 B2 8/2007 Burrows
7,273,422 B2 9/2007 Vokey et al.
7,285,057 B2 10/2007 Mann, Jr. et al.
7,341,527 B1 3/2008 Fisher
7,364,513 B2 4/2008 Krumme
7,413,517 B2 8/2008 Butler, Jr. et al.
7,431,662 B2 10/2008 Tucker, Sr. et al.
7,442,129 B2 10/2008 Bardha
7,455,597 B2 11/2008 Matsunaga
7,473,186 B2 1/2009 Best
D596,687 S 7/2009 Bezilla et al.
7,566,276 B2 7/2009 Billings
7,568,983 B2 8/2009 Gilbert
7,588,499 B2 9/2009 Tateno
7,594,863 B2 9/2009 Ban
D603,009 S 10/2009 Bezilla et al.
7,604,550 B1 10/2009 Currie
7,662,049 B2 2/2010 Liu et al.
7,691,006 B1 4/2010 Burke
7,749,098 B2 7/2010 Johnson
7,749,099 B2 7/2010 Ban et al.
7,780,548 B2 8/2010 Solheim
D624,616 S 9/2010 Rife
D624,617 S 9/2010 Rife
7,794,335 B2 9/2010 Cole et al.
7,862,450 B2 * 1/2011 Gilbert ..... A63B 53/04 473/330
8,033,931 B2 2/2011 Wahl
7,905,797 B2 3/2011 Gilbert et al.
7,914,394 B2 3/2011 Cole et al.
7,922,602 B2 4/2011 Johnson
7,942,758 B2 5/2011 Nakamura
8,021,245 B2 9/2011 Beach
8,066,586 B2 11/2011 Solheim et al.
8,282,505 B2 * 10/2012 Solheim et al. ..... 473/331
8,382,604 B2 2/2013 Billings
8,523,703 B2 9/2013 Rife
8,545,343 B2 10/2013 Boyd et al.
8,617,001 B2 12/2013 Sandival
8,636,607 B2 1/2014 Renna
8,764,578 B2 * 7/2014 Solheim et al. ..... 473/331
8,790,193 B2 * 7/2014 Serrano et al. ..... 473/331
9,108,088 B2 8/2015 Serrano et al.
9,849,351 B2 12/2017 Serrano
9,943,735 B2 4/2018 Rife et al.
9,987,530 B2 6/2018 Jertson
2005/0209020 A1 9/2005 Burrows
2008/0125241 A1 * 5/2008 Tateno ..... A63B 53/0487 473/331
2008/0125242 A1 * 5/2008 Ban ..... A63B 53/047 473/331
2008/0171613 A1 7/2008 Gilbert
2008/0242442 A1 * 10/2008 Gilbert ..... A63B 60/02 473/331
2008/0242443 A1 10/2008 Gilbert
2009/0247318 A1 10/2009 Ban et al.
2010/0029401 A1 * 2/2010 Nakamura ..... A63B 60/00 473/290
2010/0035702 A1 2/2010 Solheim et al.
2010/0261545 A1 * 10/2010 Ban ..... A63B 53/047 473/331
2011/0165963 A1 7/2011 Cackett et al.
2012/0071269 A1 3/2012 Rahrig
2013/0157776 A1 6/2013 Serrano et al.
2014/0187343 A1 7/2014 Serrano
2015/0209629 A1 7/2015 Serrano
2016/0016050 A1 1/2016 Rife et al.

FOREIGN PATENT DOCUMENTS

GB 2293982 4/1996
JP 09047532 2/1997
JP H0975486 3/1997
JP 2813969 10/1998
JP 10263118 10/1998
JP 11047317 2/1999
JP 2000176058 6/2000
JP 2000225217 A * 8/2000 ..... A63B 53/047
JP 2002153575 5/2002
JP 2002239040 8/2002

(56) References Cited

FOREIGN PATENT DOCUMENTS

| | | | | |
|---|---|---|---|---|
| JP | 2005287534 | | 10/2005 | |
| JP | 1024897 | | 4/2007 | |
| JP | 2007301017 A | * | 11/2007 | ..... A63B 53/0445 |

OTHER PUBLICATIONS

International Search Report and Written Opinion dated Jun. 5, 2016 for PCT Application No. PCT/US2015/018813, filed Mar. 4, 2015.
Jeffery B. Ellis, The Club Maker's Art, Antique Golf Clubs and Their History, vol. 1, p. 253, C and C Offset Printing Co., Ltd. (Portland, Oregon 2007).
Truth Digest MyGolfSpy, Machine M2A Converter Putter—Part 1, The Story and The Putter, https://forum.mygolfspy.com/topic/4634-machine-m2a-converter-putter-%C3%A2%E2%82%AC%E2%80%9C-part-1-%C3%A2%E2%82%AC%E2%80%9C-the-story-and-the-putter/, Nov. 2011.
Dave Billings' Golf Locker—Tales and Treasure from 25 years in Golf, http://daveysgolflocker.blogspot.com/, Oct. 5, 2012.
Machine Putters Picture Thread, https://forums.golfwrx.com/discussion/171701/machine-putters-picture-thread/p4, Jan. 9, 2007.
Machine Putters Picture Thread, https://forums.golfwrx.com/discussion/171701/machine-putters-picture-thread/p10, Feb. 1, 2007.
Machine Putters Picture Thread, https://forums.golfwrx.com/discussion/171701/machine-putters-picture-thread/p31, Sep. 6, 2009.
Vintage Rare Lilac Bros. No Scuff Putter Dearborn Mich., https://www.worthpoint.com/worthopedia/vintage-lilac-bros-scuff-putter-46140117, Nov. 19, 2012.
Putter, Laser Light By Clayton, https://www.worthpoint.com/worthopedia/putter-laser-light-clayton-151457342, May 6, 2011.
Never Comprise Milled Series, https://forums.golfwrx.com/discussion/2491/never-compromise-milled-series, Jun. 30, 2005.
International Search Report from corresponding PCT Application No. PCT/US2012/057503, mailing date. Frb. 27, 2013.
Written Opinion from corresponding PCT Application No. PCT/US2012/057503 mailing date Feb. 27, 2013.

* cited by examiner

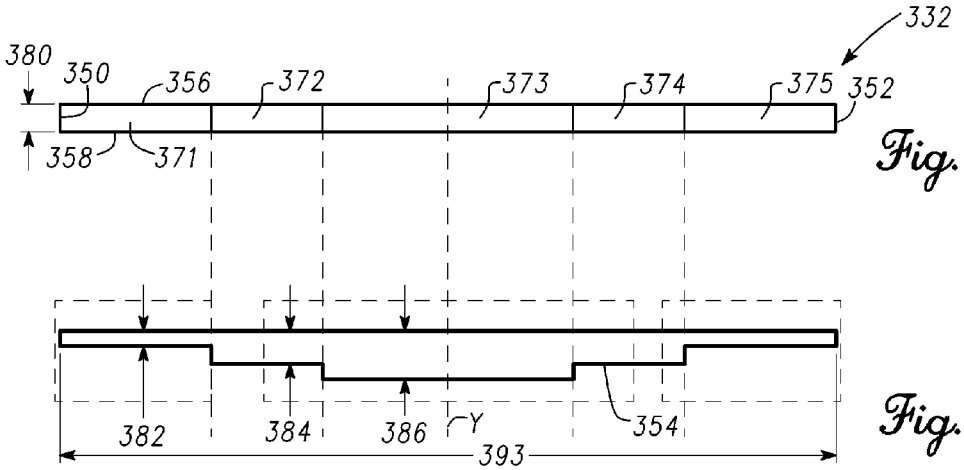
Fig. 9
Fig. 10
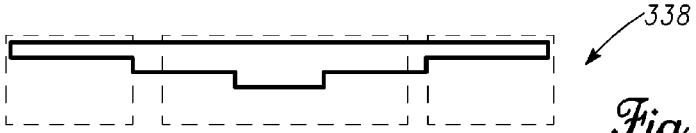
Fig. 11
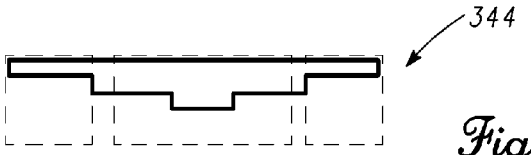
Fig. 12
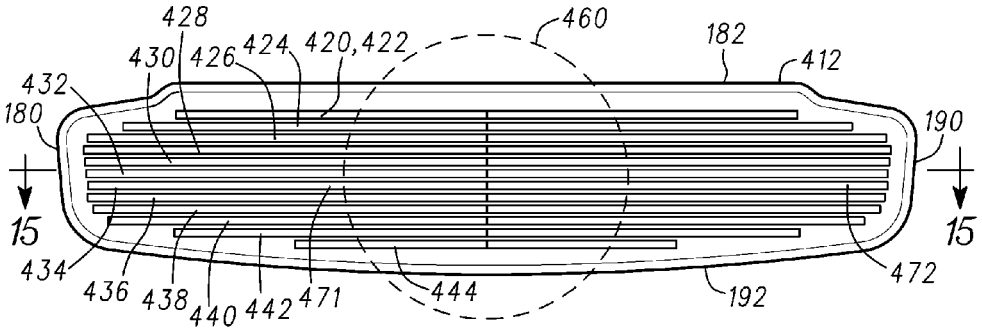
Fig. 13

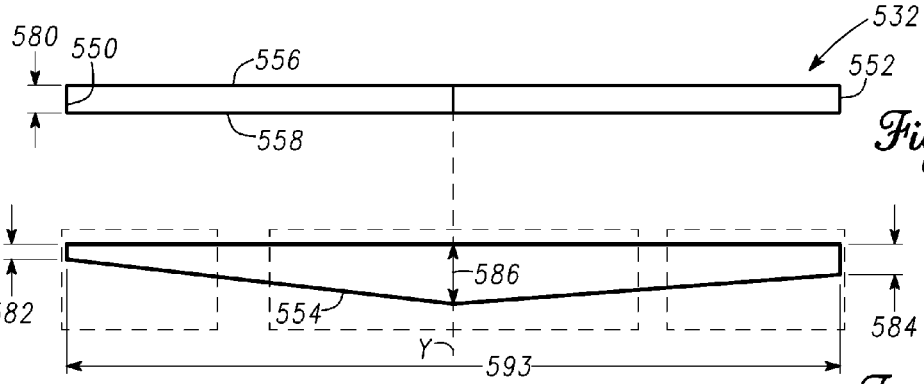
Fig. 19
Fig. 20
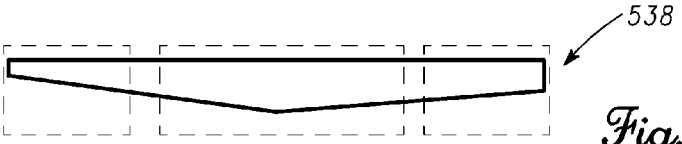
Fig. 21
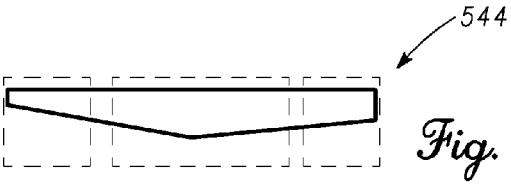
Fig. 22
Fig. 23
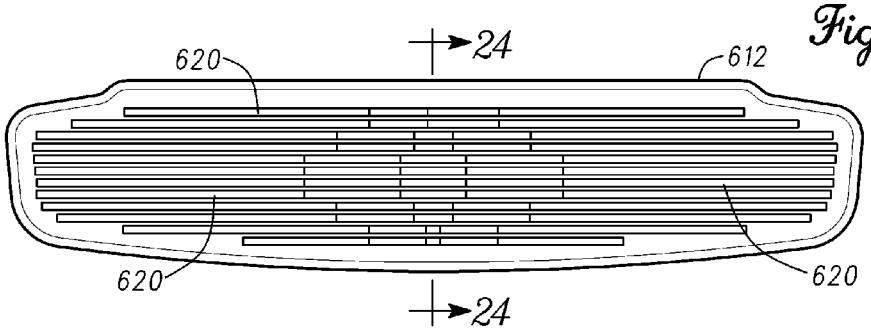
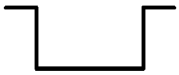
Fig. 24
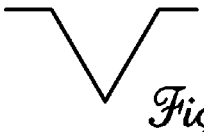
Fig. 25
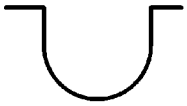
Fig. 26

GROOVES OF GOLF CLUB HEADS AND METHODS TO MANUFACTURE GROOVES OF GOLF CLUB HEADS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE

[The present application] *This is a reissue of U.S. patent application Ser. No. 13/628,685, filed on Sep. 27, 2012, now U.S. Pat. No. 9,108,088, issued on Aug. 18, 2015,* which claims the benefit of U.S. Provisional Patent Application Ser. No 61/697,994, filed on Sep. 7, 2012 and U.S. Provisional Patent Application Ser. No. 61/541,981 filed on Sep. 30, 2011. *U.S. patent application Ser. No. 13/628,685 is also a continuation-in-part of U.S. patent application Ser. No. 13/591,620, filed on Aug. 22, 2012, now U.S. Pat. No. 8,764,578, issued on Jul. 1, 2014, which is a continuation of U.S. patent application Ser. No. 13/237,293, filed on Sep. 20, 2011, now U.S. Pat. No. 8,282,505, issued on Oct. 9, 2012, which is a continuation of U.S. patent application Ser. No. 12/535,868, filed on Aug. 5, 2009, now U.S. Pat. No. 8,066,586, issued on Nov. 29, 2011, which claims the benefit of U.S. Provisional Patent Application Ser. No. 61/087,158, filed Aug. 7, 2008,* all of which are incorporated herein by reference.

FIELD

The present disclosure relates generally to golf equipment, and more particularly, to grooves of golf club heads and methods to manufacture grooves of golf club heads.

BACKGROUND

Typically, a golf club head may include a club face with a plurality of parallel, grooves extending between the toe end and the heel end. In particular, the plurality of grooves in an iron-type club head may clear out water, sand, grass, and/or other debris between a golf ball and the club face. Golf club faces may have grooves with various shapes such as squared or box-shaped grooves, V-shaped grooves, or U-shaped grooves.

BRIEF DESCRIPTION OF THE DRAWINGS

FIG. 9 shows a schematic top view of a groove of the ball striking face of FIG. 8.

FIG. 10 shows a horizontal cross-sectional diagram of the groove of FIG. 9 taken at section 10-10 of FIG. 8.

FIG. 11 shows a horizontal cross-sectional diagram of another groove of the ball striking face FIG. 8.

FIG. 12 shows a horizontal cross-sectional diagram of another groove of the ball striking face FIG. 8.

FIG. 13 shows a schematic diagram of a ball striking face of a putter according to one example.

FIG. 19 shows a schematic top view of a groove of the ball striking face of FIG. 18.

FIG. 20 shows a horizontal cross-sectional diagram of the groove of FIG. 19 taken at section 20-20 of FIG. 18.

FIG. 21 shows a horizontal cross-sectional diagram of another groove of the ball striking face FIG. 18.

FIG. 22 shows a horizontal cross-sectional diagram of another groove of the ball striking face FIG. 18.

FIG. 23 shows a schematic diagram of a ball striking face of a putter according to one example.

FIGS. 24-26 show different examples of vertical cross sections of grooves of the ball striking face of FIG. 23 taken at section 24-24 of FIG. 23.

DESCRIPTION

In general, grooves of golf club heads and methods to manufacture grooves of golf club heads are described herein. Golf equipment related to the methods, apparatus, and/or articles of manufacture described herein may be conforming or non-conforming to the rules of golf at any particular time. Further, the figures provided herein are for illustrative purposes, and one or more of the figures may not be depicted to scale. The apparatus, methods, and articles of manufacture described, herein are not limited in this regard.

Figure 1:
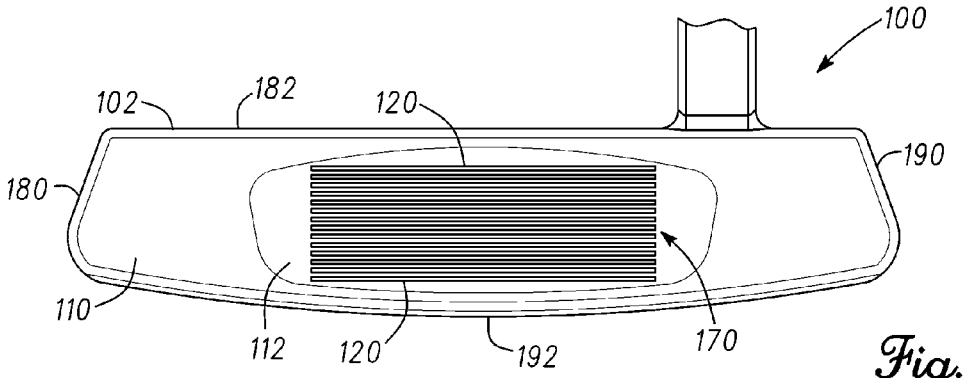
FIG. 1 shows a putter according to one example.

In the examples of FIG. 1, a putter 100 is shown. Although grooves for a putter 100 are described herein, the apparatus, methods, and articles of manufacture described herein may be applicable other types of club head (e.g., a driver-type club head, a fairway wood-type club head, a hybrid-type club head, an iron-type club head, etc.). For example, grooves for iron-type club heads are described in detail in U.S. Patent Application Publication US 2010/0035702, filed Aug. 5, 2009, the entire disclosure of which is expressly incorporated by reference. Accordingly, any reference made herein to a putter may include any type of golf club, The putter 100 includes a putter head 102 having a putter face 110. The putter face 110 may be generally planar. The putter face 110 includes a ball striking face 112 that may be generally on the same plane as the putter face 110 or slightly projected outward from the putter face 110. The ball striking face 112 may be the same size or smaller (as shown in FIG. 1) than the putter face 110, The ball striking face 112 may be a region on the putter face 110 that is generally used to. strike a golf ball (not shown). However, an individual may also strike a ball with a section of the putter face 110 that is outside the ball striking face 112.

The ball striking face 112 may be a continuous or integral part of the putter face 110 or formed as an insert that is attached to the putter face 110. Such an insert may be constructed from the same material or different materials as the putter face 110 and then be attached to the putter face 110. The ball striking face 112 may include one or more grooves, generally shown as grooves 120. one or more land portions 170. For example, the ball striking facet 12 is shown to have twelve grooves, generally shown as 122, 124, 126, 128, 130, 132, 134, 136, 138, 140, 142, and 144. The grooves 120 may be generally referred to with a single reference number such as 120. However, when specifically describing one of the grooves on the ball striking face 112, the reference number for that specific groove may be used.

Two adjacent grooves may be separated by a land portion 170. A land portion 170 between each groove 120 and an adjacent groove 120 may have the same or different width as a land portion 170 between another pair of adjacent grooves 120. The land portions 170 may also define the top surface of the ball striking face 112. In general, two or more of the grooves 120 may be parallel to each other. For example, the grooves 122 and 124 may be parallel to each other. However, the grooves 120 may be oriented relative to each other in any manner. For example, any of the grooves 120 may be diagonally, vertically and/or horizontally oriented. As shown in the example of FIG. 2, one or more of the grooves 120 may be substantially linear and generally parallel to an adjacent groove 120 and extend between a toe end 180 and a heel end 190 of the putter face 110.

As described in detail below, the depth, length, width, a horizontal cross-sectional shape, and/or a vertical cross-sectional shape of the grooves 120 may linearly, nonlinearly, in regular or irregular step-wise intervals, arcuately and/or according to one or more geometric shapes increase, decrease and/or vary from the toe end 180 to the heel end 190 and/or from a top rail 182 to a sole 192 of the putter head 102. The apparatus, methods, and articles, of manufacture described herein are not limited in this regard.

Figure 2:
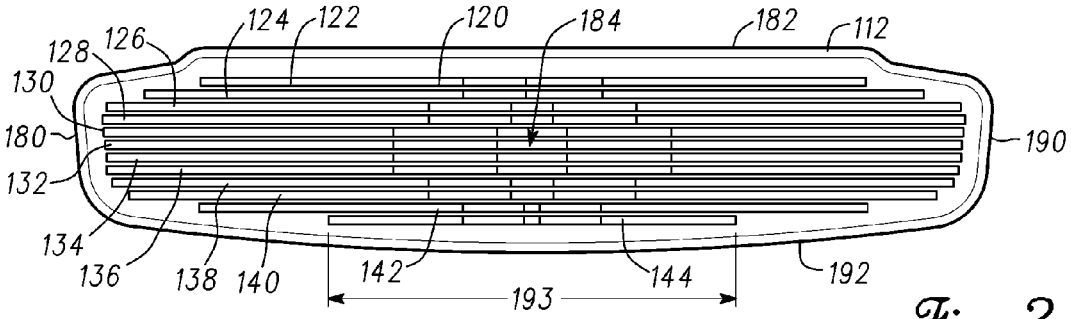
FIG. 2 shows a schematic diagram of a ball striking face of a putter according to one example.

Referring to FIG. 2, the ball striking face 112 is shown having grooves 122-144. The ball striking face 112 may be an integral part of the putter face 110 such as to be co-manufactured with the putter face 110. Alternatively, the ball striking face 112 may be an insert that is attached to the putter face 110. Each of the grooves 120 may extend from the toe end 180 to the heel end 190 to define a corresponding length 193 (only the length 193 of groove 144 is shown in FIG. 2). The lengths 193 of some or all of the grooves 120 may vary in a direction from the top rail 182 to the sole 192 so that each groove 120 may generally conform to the shape of the perimeter of the ball striking face 112, For example, the length of the grooves may increase from near the top rail 182 to a center 184 of the ball striking face 112 and decrease from the center 184 to near the. sole 192. The center 184 may be a geometric center of the ball striking face 112. Alternatively, the center 184 may represent an inertial or weight related center of the ball striking face 112. However, the center 184 may be generally defined by a region of the ball striking face 112 that typically strikes the ball. As shown in FIG, 1, the length 193 of the grooves 120 may be similar. In other examples, such as the example shown in FIG. 2, the length 193 of the grooves may decrease from near the top rail 182 to the center 184 and decrease from near the sole 192 to the center 184. Thus, any groove length arranged on the ball striking face 112 is within the scope of the disclosure.

Figure 3:
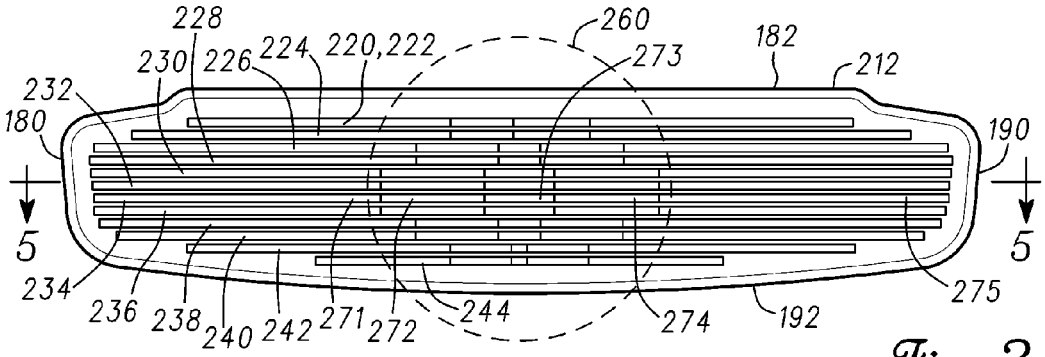
FIG. 3 shows a schematic diagram of a ball striking face of a putter according to one example.

In another example shown in FIG. 3, a ball striking face 212 may include grooves 220 (shown specifically as grooves 222-244). The ball striking face 212 may be an integral part of the putter face 110 or a separate piece that is attached to the putter face 110. Accordingly, when describing the ball striking face 212, parts of the putter 100 and the putter head 102 are referred to with the same reference numbers described above.

Figure 4:
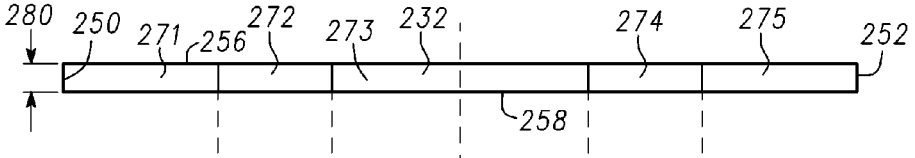
FIG. 4 shows a schematic top view of a groove of the ball striking face of FIG. 3.
Figure 5:
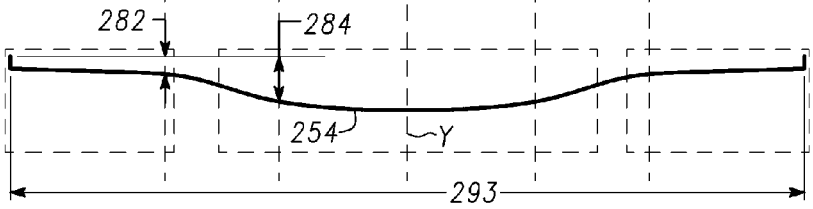
FIG. 5 shows a horizontal cross-sectional diagram of the groove of FIG. 4 taken at section 5-5 of FIG. 3.

FIG. 4 shows a schematic view of the groove 232 and FIG. 5 shows a horizontal cross section of the groove 232 taken at section line 5-5 of FIG. 3. The groove 232 is shown to be divided into horizontally spanning regions, generally shown as regions 271-275, which are visually defined in FIGS. 3 and 4 by vertical boundary lines. The horizontal regions 271-275 may define variations in the horizontal cross-sectional profile of the groove 232 from near the toe end 180 to near the heel, end 190 and/or from near the top rail 182 to near the sole 192. Horizontal cross-sectional profile of a groove may refer to any property of the groove along the length 293 of the groove, such as length of a certain section of the groove, depth, width, cross-sectional shape, and/or construction materials. In the example of FIGS. 3-7, the grooves 220 include a first vertical wall 250 and a second vertical wall 252 that define the length 293 of the grooves 220. Each of the grooves 220 has a bottom surface 254 which defines a depth of the groove 220. The depth of each groove may vary from the first wall 250 to the second. wall 252 according to the cross-sectional profile of the groove 220 in the regions 271-275. Each groove 220 also includes a first horizontal wall 256 and a second horizontal wall 258 that define the vertical boundaries of the groove 220. The distance between the first horizontal wall 256 and the second horizontal wall 258 defines a width 280 of the groove 220. The with 280 may vary from the first vertical wall 250 to the second vertical wail 252 as shown in the examples of FIGS. 38-45, where a groove may have a length 590, a first width 594, a second width 595 and/or a third width 596. In the example of FIGS. 3-7, however, the first horizontal wall 256 and the second horizontal wall 258 are generally parallel to define a generally constant width 280.

Referring to FIG. 5, the bottom surface 254 at the region 271 is downwardly sloped or carved to define a first depth 282 at the boundary between regions 271 and 272. The bottom surface 254 in the region 272 transitions with a steeper downward curve from the first depth 282 to a second depth 284 at the boundary between regions 272 and 273. If the bottom surface 254 is flat in the region 273, the second depth 284 may generally define the greatest depth of the groove 232. However, if the bottom surface 254 is not flat, the greatest depth of the groove 232 may be defined in another part of the region 273. Any of the grooves 220 may be symmetric about the vertical axis y. Accordingly, the shape of the groove 220 on each side of they axis may mirror the shape of the groove 232 on the other side of the y axis. However, any of the grooves 220 may be asymmetric. The regions 271 arid 275 define shallow portions of the groove 232 and the region 273 defines the deeper center portion of the groove 232. The deepest part of any of the grooves 220 may be at the center of the groove 220. The regions 272 and 274 facilitate transition of the bottom surface 254 from the depth 282 to the depth 284.

Figure 6:
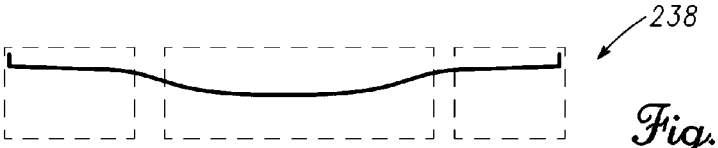
FIG. 6 shows a horizontal cross-sectional diagram of another groove of the ball striking face FIG. 3.
Figure 7:
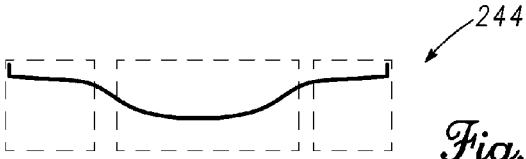
FIG. 7 shows a horizontal cross-sectional diagram of another groove of the ball striking face FIG. 3.

Referring to FIGS. 3 and 5, the general cross-sectional profile of each of the grooves 220 may remain generally similar from the top rail 182 to the sole 190. However, the cross-sectional profile including lengths, widths and/or depths of the regions 271-275 of each of the grooves 220 may progressively vary from the top rail 182 to the sole 192. In FIGS. 6 and 7, the horizontal cross sections of the grooves 238 and 244, respectively, are shown. For example, the regions 271-275 of the groove 238 are smaller in length than the regions 271-275 of the groove 232, respectively. Similarly, the regions 271-275 of the groove 244 are smaller in length than the regions 271-275 of the groove 238, respectively. In another example, the regions 271-275 of the groove 238 may have smaller depths than the regions 271-275 of the groove 232, respectively. Similarly, the regions 271-275 of the groove 244 may have smaller depths than the regions 271-275 of the groove 238, respectively.

The progressive increase in the length, depth and/or width of the regions 271-275 of the grooves 222-232 from the top rail 182 to generally the center of the bail striking face 212 and/or the decrease in the size of the regions 271-275 of the grooves 232-244 from generally the center of the ball striking face 212 to the sole 192 forms a central strike, zone 260 (shown in FIG. 3), which may resemble the shape of a golf ball when viewed by an individual in an address position. The approximate visual representation of a golf ball can assist an individual with lining up the ball striking face 212 with the ball. The regions 273, which define the deepest parts of the grooves 220 may be larger in length at the center of the ball striking face 212 and progressively reduce in length toward the top rail 182 and the sole 192. Similarly, the transition regions 272 and 274 may have the greatest length at the center of the ball striking face 212 and progressively reduce in length toward the top rail 182 and the sole 192. Although the lengths of the regions 271-275 may vary depending on the location of the grooves 220 on the ball striking face 212, the depth of similar regions for each groove 220 may be similar or different. For example, the greatest depth of the groove 232 may be similar to the greatest depth of the groove 244. Alternatively, the depth of the grooves 222-244 may vary based on the location of the groove 220 relative to ball striking face 212. Alternatively yet, the depths of the grooves 222-244 may vary in any manner from the top rail 182 to the sole. Although the above examples may describe particular number of horizontal regions, the apparatus, methods, and articles, of manufacture described herein may include more or less horizontal regions.

Figure 8:
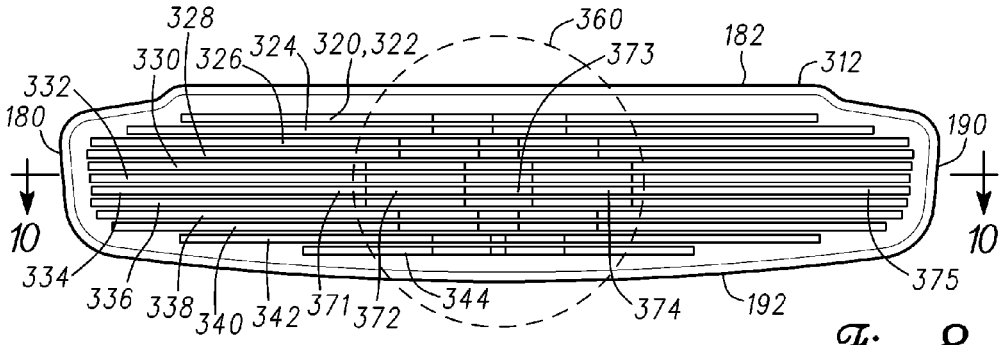
FIG. 8 shows a schematic diagram of a ball striking face of a putter according to one example.

In another example shown in FIG. 8, a ball striking face 312 includes grooves 320 (shown specifically as grooves 322-344). The ball striking face 312 may he an integral part of the putter face 110 or a separate piece that is attached to the putter face 110. Accordingly, when describing the ball striking face 312, parts of the putter 100 and the putter head 102 are referred to with the same reference numbers described above.

FIG. 9 shows a schematic view of the groove 332 and FIG. 10 shows a horizontal cross section of the groove 332 taken at section line 10-10 of FIG. 8. The groove 332 is shown to be divided into horizontally spanning regions 371-375, which are visually defined in FIGS. 8 and 9 by vertical boundary lines. The horizontal regions 371-375 may define variations in the horizontal cross-sectional profile of the groove 332 from near the toe end 180 to near the heel end 190 and/or from near the top rail 182 to near the sole 192. Horizontal cross-sectional profile of a groove may refer to any property of the groove, along the length 393 of the groove, such as length of a certain section of the groove, depth, width, cross-sectional shape, and/or construction materials. In the example of FIGS. 8-12, the grooves 320 include a first vertical wall 350 and, a second vertical wall 352 that define the length 393 of the grooves 320. Each of the grooves 320 has a bottom surface 354 which defines a depth of the groove 320. The depth of each groove may vary from the first wall 350 to the second wall 352 according to the cross-sectional profile of the groove 320 in the regions 371-375. Each groove 320 also includes a first horizontal wall 356 and a second horizontal wall 358 that define the vertical boundaries of the groove 320. The distance between the first horizontal wall 356 and the second horizontal wall 358 defines a width 380 of the groove 320. The width 380 may vary from, the first vertical wall 350 to the second vertical wall 352 as shown in the examples of FIGS. 38-45. In the example of FIGS. 8-12, however, the first horizontal wall 256 and the second horizontal wall 258 are generally parallel to define a generally constant width 380.

Referring to FIG. 10, the bottom surface 354 at the region 371 may be generally flat and/or slightly sloped to define a first depth 382 at the boundary between 371 and 372. The bottom surface 354 in the region 372 transitions with a step downward from the first depth 382 to a second depth 384 at the boundary between the regions 372 and 373. The bottom surface 354 in the region 372 may be generally flat and/or slightly sloped such that the groove 320 has a generally uniform depth 384 in the region 372. The bottom surface 354 in the region 372 transitions with a step downward from the second depth 384 to a third depth 386. The bottom surface 354 in the region 373 may be generally flat or slightly sloped such that the groove 320 has a generally uniform depth 386 in the region 373. Any of the grooves 320 may be symmetric about the vertical axis y. Accordingly, the shape of the groove 320 on each side of the y axis mirrors the shape of the groove 320 on the other side of the y axis. However, any of the grooves 320 may be asymmetric. The depth 386 represents the greatest depth of the grooves 320.

Referring to FIGS. 10-12, the general cross-sectional profile of the grooves 320 may remain generally similar from the top rail 182 to the sole 190. However, the cross-sectional profile including the lengths, widths and/or the depths of the regions 371-375 of each of the grooves 320 may progressively vary from the top rail 182 to the sole 192. In FIGS. 11 and 12, the horizontal cross sections of the grooves 338 and 344, respectively, are shown. For example, the regions 371-375 of the groove 338 are smaller in length than the regions 371-375 of the groove 332, respectively. Similarly, the regions 371-375 of the groove 344 are smaller in length than the regions 371-375 of the groove 338, respectively. In another example, the regions 371-375 of the groove 338 may have smaller depths than the regions 371-375 of the groove 332, respectively. Similarly, the regions 374-275 of the groove 344 may have smaller depths than the regions 371-375 of the groove 338, respectively.

The progressive increase in the length, depth and/or width of the regions 371-375 of the grooves 322-332 from the top rail 182 to the center of the ball striking face 312 and/or the decrease in the size of the regions 371-375 of the grooves 332-344 form the center of the ball striking face 312 to the sole 192 forms a central strike zone 360 (shown in FIG. 8), which may discretely resemble the shape of a golf ball when viewed by an individual in an address position. The approximate visual representation of a golf ball can assist an individual with lining up the ball striking face 312 with the ball. The regions 373, which define the deepest parts of the grooves 360 may be larger in length at the center of the ball striking face 312 and progressively reduce in length toward the top rail 182 and the sole 192. Similarly, the transition regions 372 and 374 may have the greatest length at the center of the ball striking face 312 and progressively reduce in length toward the top rail 182 and the sole 192. Although the lengths of the regions 371-375 vary depending on the location of the grooves 320 on the ball striking face 312, the depth of similar regions for each groove 320 may be similar or different. For example, the greatest depth of the groove 344 may be similar to the greatest depth of the groove 332. Alternatively, the depth of the grooves 322-344 may vary based on the location of grooves 320 on the ball striking face 312. Alternatively yet, the depths of the grooves 322-344 may vary in any manner from the top rail 182 to the sole. Although the above examples may describe a particular number of horizontal regions, the apparatus, methods, and articles of manufacture described herein may include more or less horizontal regions.

In another example shown in FIG. 13, a ball striking face 412 includes grooves 420 (shown specifically as grooves 422-444). The ball striking face 412 may be an integral part of the putter face 110 or a separate piece that is attached to the putter face 110. Accordingly, when describing the ball striking face 412, parts of the putter 100 and the putter head 102 are referred to with the same reference numbers described above.

Figure 14:
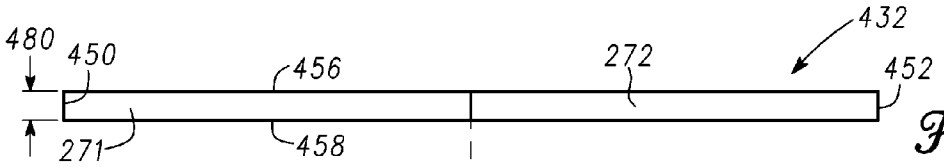
FIG. 14 shows a schematic top view of a groove of the bail striking face of FIG. 13.
Figure 15:
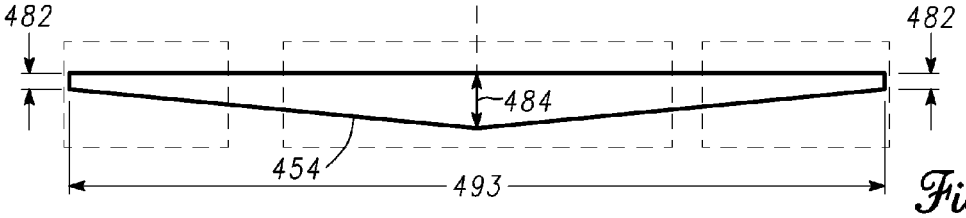
FIG. 15 shows a horizontal cross-sectional diagram of the groove, of FIG. 14 taken at section 15-15 of FIG. 13.

FIG. 14 shows a schematic view of the groove 432 and FIG. 15 shows a horizontal cross section of the groove 432 taken at section line 15-15 of FIG. 13. The groove 432 is shown to be divided into horizontally spanning regions 471 and 472, which are visually defined in FIGS. 13 and 14 by the boundary lines of the groove 432 and a vertical line at the center of the groove 432. The horizontal regions 471 and 472 may define variations in the horizontal cross-sectional profiles of the groove 432 from near the toe end 180 to near the heel end 190 and/or from near the top rail 182 to near the sole 192. Horizontal cross-sectional profile of a groove refers to any property of the groove along the length 493 of the groove, such as length of a certain section of the groove, depth, width, cross-sectional shape, and/or construction materials. In the example of FIGS. 13-17, the grooves 420 include a first vertical wall 450 and a second vertical wall 452 that define the length 493 of the grooves 420. Each of the grooves 420 has a bottom surface 454 which defines a depth of the groove 420. The depth of each groove may vary from the first wall 450 to the second wall 452 according to the cross-sectional profile of the groove 420 in the regions 471 and 472. Each groove 420 also includes a first horizontal wall 456 and a second horizontal wall 458 that define the vertical boundaries of the groove 420. The distance between the first horizontal wall 456 and the second horizontal wall 458 defines a width 480 of the groove 420. The width 480 may vary from the first vertical wall 450 to the second vertical wall 452 as shown in the examples of FIGS. 38-45. In the example of FIGS. 13-17, however, the first horizontal wall 456 and the second horizontal wall 458 are generally parallel to define a generally constant width 480.

Referring to FIG. 15, the bottom surface 454 at the region 471 has a linear profile and is downwardly sloped. The grooves 450 are symmetric about the center vertical axis y. Accordingly, the bottom surface 454 at the region 472 has a similar linear profile and is similarly downwardly sloped as the bottom surface 454 at the region 471. Accordingly, the depth of the grooves 420 gradually increase from a depth 482 at the first wall 452 and second wall 454 to a depth 484 at the center of the grooves 420. The depth 484 represents the deepest part of the grooves 420, which may be at the center of the groove 420.

Figure 16:
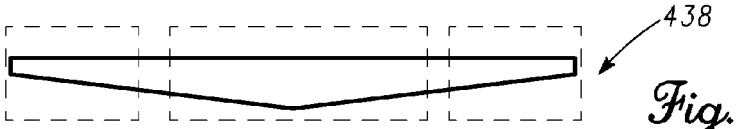
FIG. 16 shows a horizontal cross-sectional diagram of another groove of the ball striking face FIG. 13.
Figure 17:
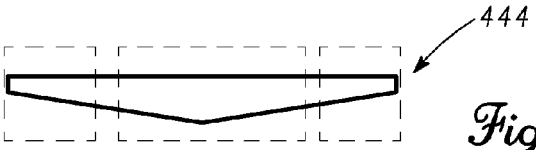
FIG. 17 shows a horizontal cross-sectional diagram of another groove of the ball striking face FIG. 13.

Referring to FIGS. 15-17, the general cross-sectional profile of the grooves 420 may remain generally similar from the top rail 182 to the sole 190. However, the cross-sectional profile including the lengths and/or the depths of the regions 471 and 472 of each of the grooves 420 may progressively vary from the top rail 182 to the sole 192. For example, the regions 471 and 472 of the groove 438 are smaller in length than the regions 471 and 472 of the groove 332, respectively. Similarly, the regions 471 and 471 of the groove 444 are smaller in length than the regions 471 and 472 of the groove 438, respectively. In another example, the regions 471 and 472 of the groove 438 may have smaller depths than the regions 471 and 472 of the groove 432, respectively. Similarly, the regions 471 and 472 of the groove 444 may have smaller depths than the regions 471 and 472 of the groove 438, respectively.

The progressive increase in the length, depth and/or width of the regions 471 and 472 of the grooves 422-432 from the top rail 182 to the center of the ball striking face 412 and/or the decrease in the size of the regions 471 and 472 of the grooves 432-444 form the center of the ball striking face 412 to the sole 192 forms a central strike zone 460 (shown in FIG. 13). The regions 471 and 472 may have the greatest length at the center of the ball striking face 412 and progressively reduce in length toward the top rail 182 and the sole 192. Although the lengths of the regions 471 and 472 vary depending on the location of the grooves 420 on the ball striking face 412, the depth of similar regions for each groove 420 may be similar or different. For example, the greatest depth of the groove 444 may be similar to the greatest depth of the groove 432. Alternatively, the depth of the grooves 422-444 may vary based on the location of grooves 420 on the ball striking face 412. Alternatively yet, the depths of the grooves 422-444 may vary in any manner from the top rail 182 to the sole. Although the above examples may describe a particular number of horizontal regions, the apparatus, methods, and articles of manufacture described herein may include more or less horizontal regions.

Figure 18:
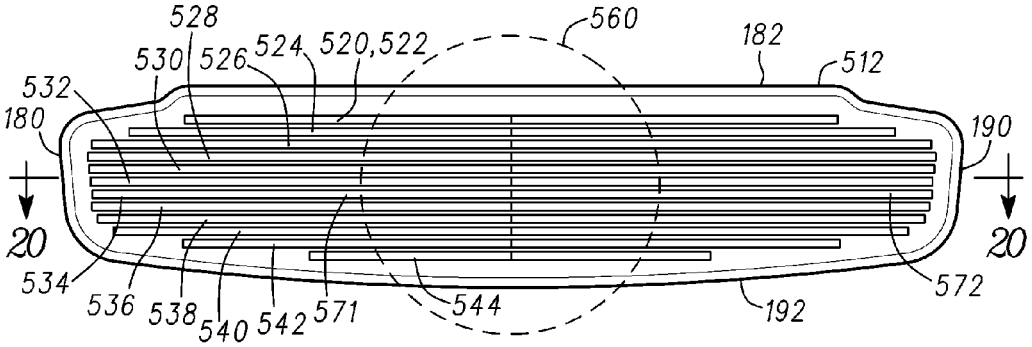
FIG. 18 shows a schematic diagram of a ball striking face of a putter according to one example.

In another example shown in FIG. 18, a ball striking face 512 includes grooves 520 (shown specifically as grooves 522-544). The ball striking face 512 may be an integral part of the putter face 110 or a separate piece that is attached to the putter face 110. Accordingly, when describing the ball striking face 512, parts of the putter 100 and the putter head 102 are referred to with the same reference numbers described above.

FIG. 19 shows a schematic view of the groove 532 and FIG. 20 shows a horizontal cross section of the groove 532 taken at section line 20-20 of FIG. 18. The groove 532 is shown to be divided into horizontally spanning regions 571 and 572, which are visually defined in FIGS. 18 and 19 by the boundary lines of the groove 532 and a vertical line at the center of the groove 532. The horizontal regions 571 and 572 may define variations in the horizontal cross-sectional profiles of the groove 532 front near the toe end 180 to near the heel end 190 and/or from, near the top rail 182 to near the sole 192. Horizontal cross-sectional profile of a groove refers to any property of the groove along the length 593 of the groove, such as a length of a certain section of the groove, depth, width, cross-sectional shape, and/or construction materials. In the example of FIGS. 18-22, the grooves 520 include a first vertical wall 550 and a second vertical wall 552 that define the length 593 of the grooves 520. Each of the grooves 520 has a bottom surface 554 which defines a depth of the groove 520. The depth of each groove may vary from the first wall 550 to the second wall 552 according to the cross-sectional profile of the groove 520 in the regions 571 and 572. Each groove 520 also includes a first horizontal wall 556 and a second horizontal wall 558 that define the vertical boundaries of the groove 520. The distance between the first horizontal wall 556 and the second horizontal wall 558 defines a width 580 of the groove 520. The width 580 may vary from the first vertical wall 550 to the second vertical wall 552 as shown in the examples of FIGS. 38-45. In the example of FIGS. 18-22, however, the first horizontal wall 556 and the second horizontal wall 558 are generally parallel to define a generally constant width 580.

Referring to FIG. 20, the bottom surface 554 at the region 571 has a linear profile and is downwardly sloped. The bottom surface 554 in the region 572 also has a linear profile and is downwardly sloped. However, because the second wall 552 is longer than the first wall 550, the bottom surface 554 in the region 572 has a smaller slope than the bottom surface 554 in the region 571. Accordingly, the grooves 550 of this example are asymmetric about the vertical center axis y. Thus, the grooves 250 have a first depth 582 defined by the first wall 550, a second depth 584 defined by the second wall 552 and a center depth 586, which is gradually reached from the depths 582 and 584 according to the downwardly sloped bottom surface 554 of the regions 571 and 572, respectively. The center depth 586 may be the depth of the deepest part of the groove 520.

Referring to FIGS. 20-22, the general cross-sectional profile of the grooves 520 may remain generally similar from the top rail 182 to the sole 190. However, the cross sectional profile including the lengths, widths and/or the depths of the regions 571 and 572 of each of the grooves 520 may progressively vary from the top rail 182 to the sole 192. In FIGS. 21 and 22, the horizontal cross sections of the grooves 538 and 544, respectively, are shown. For example, the regions 571 and 572 of the groove 538 are smaller in length than the regions 571 and 572 of the groove 532, respectively. Similarly, the regions 571 and 572 of the groove 544 are smaller in length than the regions 571 and 572 of the groove 538, respectively. In another example, the regions 571 and 572 of the groove 538 may have smaller depths than the regions 571 and 572 of the groove 532, respectively. Similarly, the regions 571 and 572 of the groove 544 may have smaller depths than the regions 571 and 572 of the groove 538, respectively.

The progressive increase in the length, depth and/or width of the regions 571 and 572 of the grooves 522-532 from the top rail 182 to the center of the ball striking face 512 and/or the decrease in the size of the regions 571 and 572 of the grooves 532-544 form the center of the ball striking face 512 to the sole 192 forms a central strike zone 560 (shown in FIG. 18). The regions 571 and 572 may have the greatest length at the center of the ball striking face 512 and progressively reduce in length toward the top rail 182 and the sole 192. Although the lengths of the regions 571 and 572 vary depending on the location of the grooves 520 on the ball striking fare 512, the depth of similar regions for each groove 520 may be similar or different. For example, the greatest depth of the groove 544 may be similar to the greatest depth of the groove 532. Alternatively, the depth of the grooves 522-544 may vary based on the location of grooves 520 on the ball striking face 512. Alternatively yet, the depths of the grooves 522-544 may vary in any manner from the top rail 182 to the sole. Although the above examples may describe a particular number of horizontal regions, the apparatus, methods, and articles of manufacture described herein may include more or less horizontal regions.

The grooves 220, 320, 420 and 520 described above illustrate four examples of horizontal cross-sectional profile of grooves for use with the putter 100. Other examples of horizontal cross sectional profiles are shown in FIGS. 29-37, where each groove may have a length 590, a first depth 591, a second depth 592 and/or a third depth 593. A groove may be defined by any number of horizontal regions, where any one or more regions have similar properties or dissimilar properties. A groove that may be symmetric or asymmetric about the y axis, for example, may have a bottom surface with a complex combination of linear and nonlinear shapes defining similar or various depths from the toe end 180 to the heel end 190. Such a groove may be described with a large number of horizontal regions, where each region defines one or more of the noted complex shapes. Accordingly, the number, arrangement, sizes and the other properties of the horizontal ranges described above are in no way limiting to the groove cross-sectional profiles according to the disclosure.

In the above examples, the grooves on each corresponding ball striking face have similar shapes. However, the grooves on ball striking face may have dissimilar shapes. For example, a ball striking face may include a combination of grooves 220 and 320. In another example, the ball striking face may include a combination of grooves 420 and 520. Thus, any combination of groove cross-sectional profiles may be used on a ball striking face to impart a particular ball striking property to the putter.

The horizontal cross-sectional profiles of the grooves may progressively and proportionally vary from the top rail 182 to the center of the ball striking face and may progressively vary from the center of the ball striking face to the sole 192. The noted progressive variation may define a bail strike zone that is larger at the center of the ball striking face than near the top rail 182 and the sole 192. Furthermore, the progressive noted variation of the grooves horizontal cross-sectional profiles provides grooves at the center of the ball striking face and around the center of the ball striking face that have longer deep groove sections than grooves near the top rail 182 and the sole 192. However, the above-described progressive variation of the grooves is exemplary and other progressive variation schemes may be used to impart particular ball striking properties to various portions of the ball striking face.

Referring to FIG. 23, a ball striking face 612 according to another example is shown having grooves 620. FIGS. 24-26 show a vertical cross-sectional shape of the grooves 620 as viewed from section line 24-24 of FIG. 23. In FIG. 24, the vertical cross-sectional shape of the groove 620 is box-shaped, rectangular or square. In FIG. 25, the vertical cross-sectional shape of the groove 620 is V-shaped. In FIG. 26, the vertical cross-sectional shape of the groove 620 is U-shaped. The vertical cross-sectional groove shapes of FIGS. 24-26 are applicable to any groove according to the disclosure. For example, the vertical cross-sectional shape of the grooves 220 may be rectangular or square according to the grooves 620 of FIG. 24. In another example, the vertical, cross-sectional shape of the grooves 620 may be V-shaped according to the groove 620 of FIG. 25. Furthermore, the vertical cross-sectional shape of a groove may vary from the toe end 180 to the heel end 190. For example, with reference to FIGS. 4 and 5, a groove 220 may be have a square or rectangular vertical cross-sectional shape in regions 271 and 275, U-shaped vertical cross-sectional shape in regions 271 and 274, and V-shaped vertical cross-sectional shape in region 273. Additionally, the vertical cross-sectional shapes of the grooves may also vary from the top rail 182 to the sole 190. For example, grooves near the top rail 182 and the sole 192 may have a square vertical cross-sectional shape, while the grooves at the center of the club face may have a U-shaped vertical cross-sectional shape.

The ball striking face of the putter in the above examples is shown to have grooves from the top rail 182 to the sole 192. However, a ball striking face may have more or less grooves, or have sections that are without grooves. For example, a ball striking face may have several grooves at the center section of the ball strike, face and be without grooves at sections near the top rail 182 or the sole 192.

The grooves are not limited to extending horizontally across the ball striking face. The ball striking face may have vertical grooves that vary in depth as described above or a combination of vertical, and horizontal grooves with varying horizontal and/or vertical cross-sectional profiles. The orientation of the grooves may be such that a matrix-like ball striking face is provided on the putter.

Figure 27:
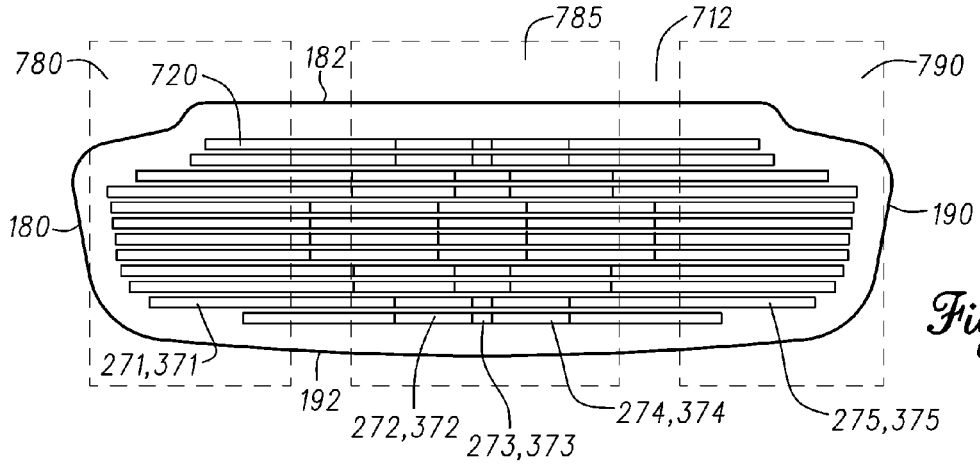
FIG. 27 shows a schematic diagram of a ball striking fare of a putter according to one example.

Referring to FIG. 27, a ball striking face 712 having grooves 720 may be horizontally separated into three portions, which are the toe portion 780, a center portion 785 and a heel portion 790. The ball striking face 712 may be similar to the ball striking face 212 and 312 described above. Accordingly the grooves 720 have regions 271-275 and 371-375 similar to grooves 220 and 320, respectively, described above. The three portions described above horizontally separate the ball striking face 712 and span vertically from the top rail 182 to the sole 192. The toe portion 780 is near the toe end 180, the heel portion 790 is near the heel end 190, and the center portion 785 is between the toe portion 780 and the heel portion 790. According to various examples, the depth of the grooves 720 at the toe portion 780 and the heel portion 790 may not be greater than the depth of the grooves 720 at the center portion 785. In one example, the shallowest depth of the grooves 720, which may be nearest to the toe end 180 or nearest to the heel end 190 may be approximately 0.003 inch. At or near the center portion 785, the depth of the grooves 720 may increase as described above to a depth of approximately 0.017 inch. The variable depth may include a portion with a depth of at least 0.020 inches but less than 0.022 inches. The variable width may include a portion with a width of at least 0.035 inches but less than 0.037 inches.

Figure 28:
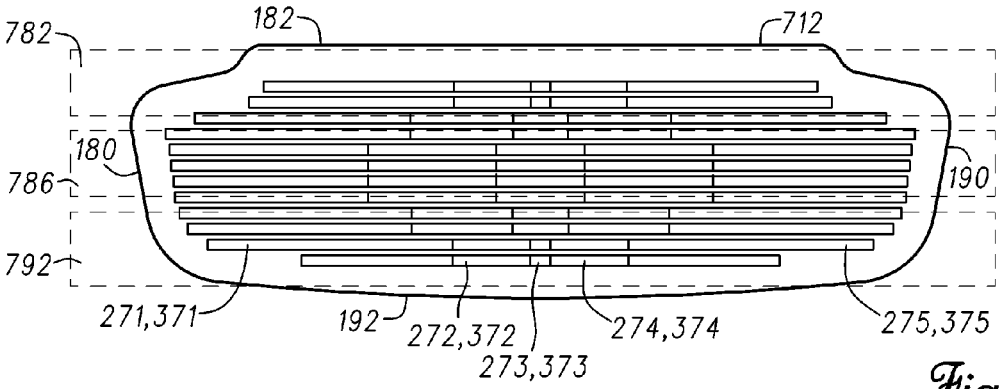
FIG. 28 shows a schematic diagram of a ball striking face of a putter according to one example.
Figure 29:
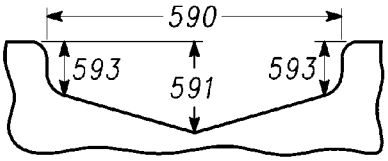
FIGS. 29-37 show schematic diagrams of exemplary horizontal cross sections of a groove of a ball striking face of a putter.
Figure 30:
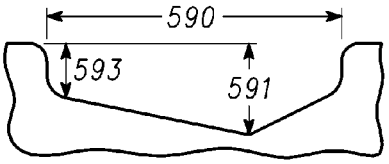
Figure 31:
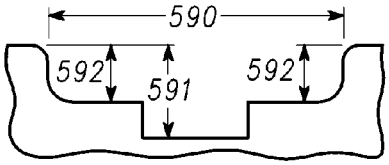
Figure 32:
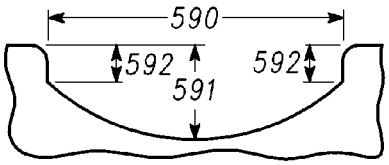
Figure 33:
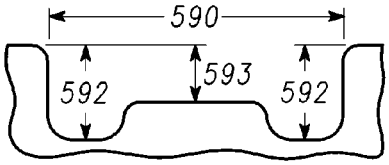
Figure 34:
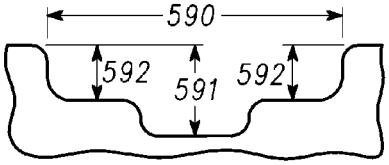
Figure 35:
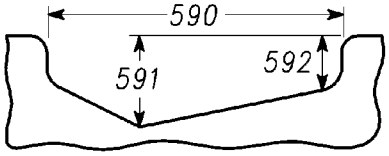
Figure 36:
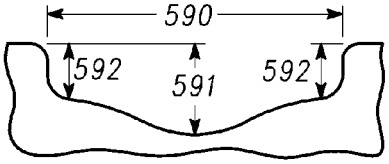
Figure 37:
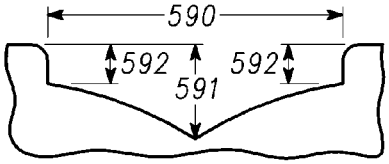
Figure 38:
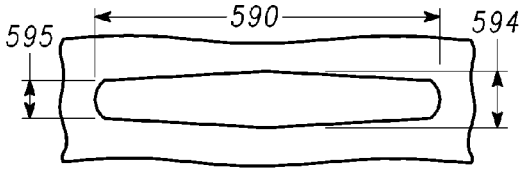
FIGS. 38-45 show schematic top views of exemplary grooves of a ball striking face of a putter.
Figure 39:
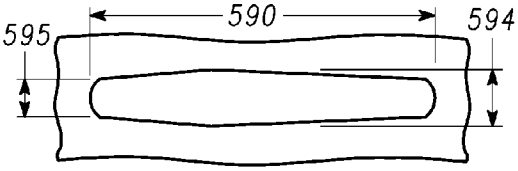
Figure 40:
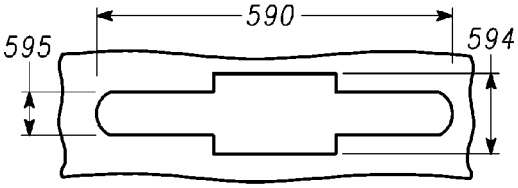
Figure 41:
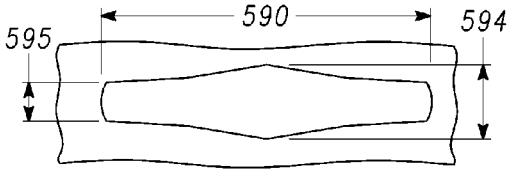
Figure 42:
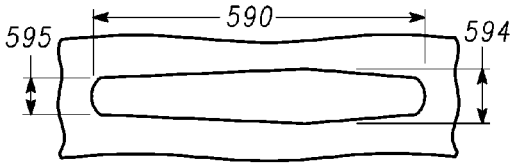
Figure 43:
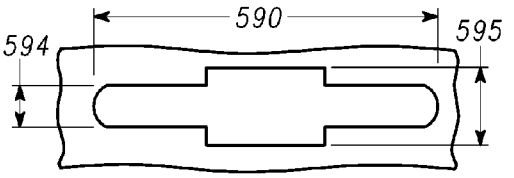
Figure 44:
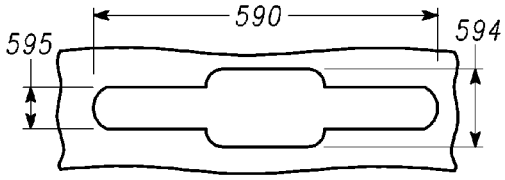
Figure 45:
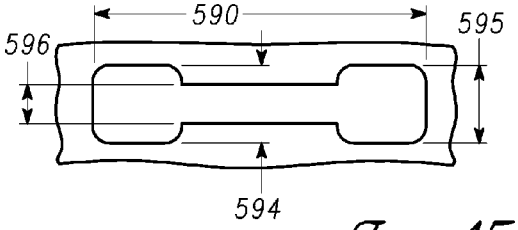

Referring to FIG. 28, the ball striking face 712 may be vertically separated into three portions, which are the top rail portion 782, the mid portion 786 and the sole portion 792. These portions vertically separate the ball striking face 712 and span horizontally from the toe end 180 to the heel end 190. The top rail portion 782 is near the top rail 182, the sole portion 792 is near the sole 192, and the mid portion 786 is between the top rail portion 782 and the sole portion 792. The length of the deepest portion of a groove 720 may vary from the top rail portion 782 to the mid portion 786 and from the mid portion 786 to the sole portion 792. For example, with respect to the examples described, above, the length of the deepest portion of a groove may refer to the groove 720 that is proximately centrally located between the top rail portion 782 and the sole portion 792. As shown in FIGS. 27 and 28, the length of the grooves 710 may be greatest at the mid portion 786 and gradually reduce toward the top rail portion 782 and toward the sole portion 792.

FIGS. 29-37 show examples of different groove horizontal cross-sectional profiles according to the disclosure. In the above examples, the width of the grooves 220, 320, 420 and 520 is shown to have a rectangular profile. However, a groove according to the disclosure may have different width profiles as shown by the examples of FIGS. 38-45. Accordingly, a groove according to the disclosure may have any horizontal cross-sectional profile, vertical cross-sectional profile, width profile and/or depth profile.

A cross-sectional profile of a groove including variations in lengths, depth, width and/or cross-sectional shape of the groove may affect ball speed, control, and/or spin. The disclosed variable depth grooves may improve the consistency of the ball speed after being struck by the putter face by about 50% over a plastic putter face insert, and by about 40% over a non-grooved aluminum putter face insert. Striking a ball with a putter having grooves according to the disclosure: (1) may result in lower ball speeds, which may result in decreased ball roll out distance; (2) may result in heel and toe shots to have decreased ball speeds compared to center hits, and also may result in shorter ball roll out distance; (3) allow relatively lower and higher handicap players to strike the ball with different locations on the potter face (higher handicap players tend to hit lower on the ball striking face whereas lower handicap player tend to hit higher on the ball striking face. Also, relatively higher handicap players may have a wider range of hit locations whereas relatively lower handicap players may have a closer range of hit locations: and/or (4) a putter face with grooves in the center of the face may result in reduced ball speed/roll out distance for center shots, which may result in a more consistent ball speed/roll out distances for center/heel/toe shots.

Figure 46:
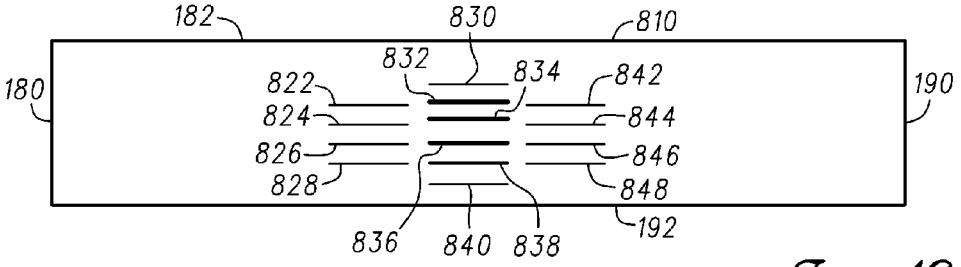
FIG. 46 shows a schematic diagram of a ball striking face of a putter according to one example.

Referring to FIG. 46, another example of a putter face 810 having grooves of variable cross-sectional profiles is shown. The putter face 810 is shown to have fourteen grooves, which are grouped into grooves 822-828 near the toe end 180, grooves 830-840 at the center of the putter face 810, and grooves 842-848 near the heel end 190. In this example, the more prominent, grooves are located at the center of the putter face 810, and less prominent grooves are on the periphery of the center. A more prominent groove may refer to a groove that has a greater depth and/or width as compared to a less prominent groove. As shown in FIG. 46, the grooves 832-838 may he more prominent that the remaining grooves on the putter face 810. Furthermore, portions of the putter face 810 may be without grooves. These portions are referred to with reference number 850.

Figure 47:
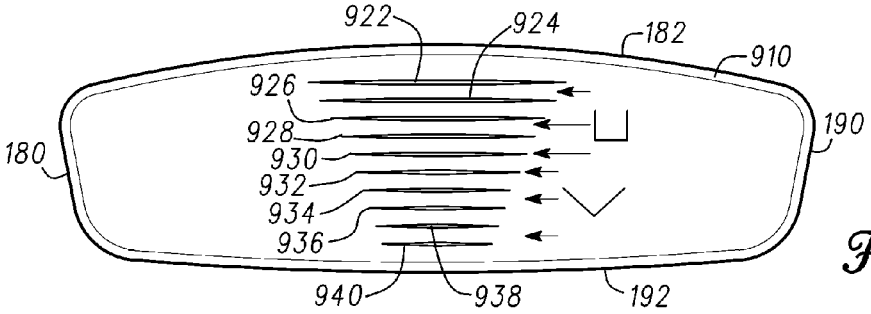
FIG. 47 shows a schematic diagram of a ball striking face of a putter according to one. example.

Referring to FIG. 47, another example of a putter face 910 having grooves of variable cross-sectional profile is shown. The putter face 910 is shown to have ten grooves 922-940. The length of each groove progressively increases from the top rail 182 to the sole 190. Each of the grooves 922-940 or groups of the grooves 922-940 may have different vertical cross-sectional shapes. For example, grooves 922-930 are shown to have box-shaped vertical cross sections, while grooves 932-940 are shown to have V-shaped vertical cross sections.

Figure 48:
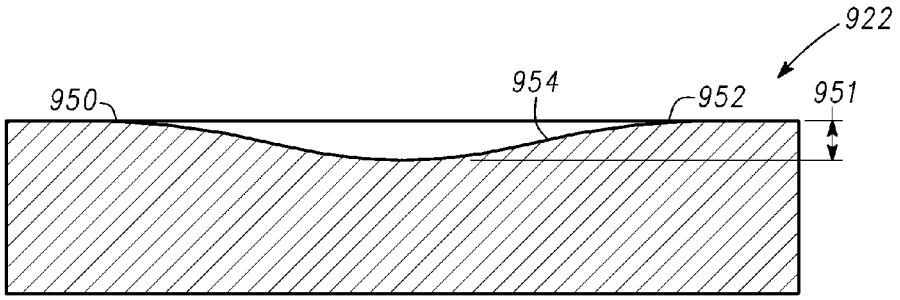
FIG. 48 is a horizontal cross-sectional view of a groove of a putter according to one example.

Referring to FIG. 48, a horizontal cross section of a groove 922 according to another embodiment is shown. A bottom surface 954 of the groove 922 is shown to gradually recede from the edges 950 and 952 of the groove to a greatest depth 951 of the groove 922. Any of the grooves according to the disclosure may have the same horizontal cross-sectional shape as the groove 922. Any of the grooves according to the disclosure may have the same depth 951. However, the depth 951 may be proportionally reduced as the length of the groove is reduced.

Figure 49:
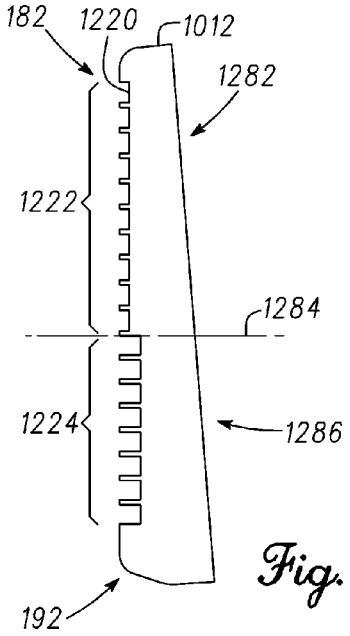
FIG. 49 shows a vertical schematic cross-sectional diagram of a putter according to one example.

In another example shown in FIG. 49, a ball striking face 1012 may include grooves 1220 (shown specifically as grooves 1222-1256). The ball striking face 1012 may be for use with the putter 100. Accordingly, parts of the putter 100 and the putter head 102 are referred to with the same reference numbers presented above. The grooves may have any cross sectional shape, length and width according to the disclosure.

Referring to FIG. 49, a side cross-sectional view of a ball striking face 1012 having grooves 1220 according to another example is shown. The ball striking face 1012 may be separated into two portions with respect to the grooves 1220. The ball striking face 1012 may include a top rail portion 1282 and the sole portion 1286. The top rail portion 1282 and the sole portion 1286 may vertically separate the ball striking face 1012 and span horizontally from the toe end 180 to the heel end 190. The top rail portion 1282 may extend generally from a center portion of the ball striking face 1012, which is represented by the center line 1284, to near the top rail 182 and include the grooves 1222. The sole portion 1286 may extend generally from near the sole 192 to the center portion 1284 and include the grooves 1224. The grooves 1224 of the sole portion 1286 may have a greater depth at one or more locations along each groove 1224 than the grooves 1222 of the top rail. portion 1282. By having shallower grooves 1222 at the top rail portion 1282, the speed by which a golf ball rolls forward after being struck by the putter may increase so as to provide a more consistent and smooth ball roll out. Alternatively, the depth of the grooves 1220 may progressively Deduce in one or more groove steps from the center portion 1284 to the top rail 182 (not shown). In another example, the depth of pairs of grooves may progressively reduce from the center portion 1284 to the top rail 182 (not shown). Accordingly, the reduction in groove depth from the sole 192 to the top rail 182 may be for each groove, for pairs of grooves or for various groupings of the grooves.

Figure 50:
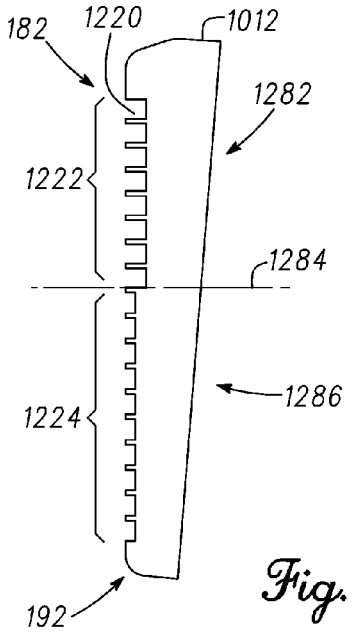
FIG. 50 shows a vertical schematic cross-sectional diagram of a putter according to one example.

Referring to FIG. 50, the grooves 1224 of the sole portion 1286 may have a smaller depth at one or more locations along each groove 1224 than the grooves 1222 of the top rail portion 1282. Alternatively, the depth of the grooves 1220 may progressively increase in one or more groove steps from the center portion 1284 and/or the sole 192 to the top rail 182. (not shown). In another example, the depth of pairs of grooves may progressively increase from the center portion 1284 and/or the sole 192 to the top rail 182 (not shown). Accordingly, the increase in groove, depth from the center portion 1284 and/or the sole 192 to the top rail 182 may be for each groove, for pairs of grooves or for various groupings of the grooves.

Figure 51:
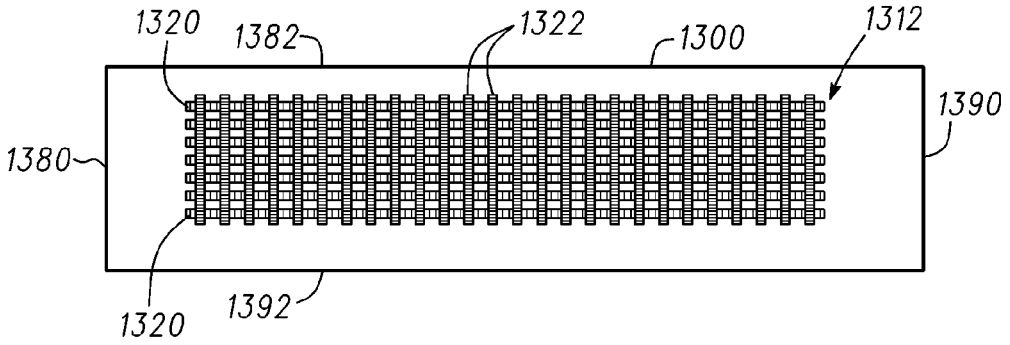
FIG. 51 shows a putter face according to another example.
Figure 52:
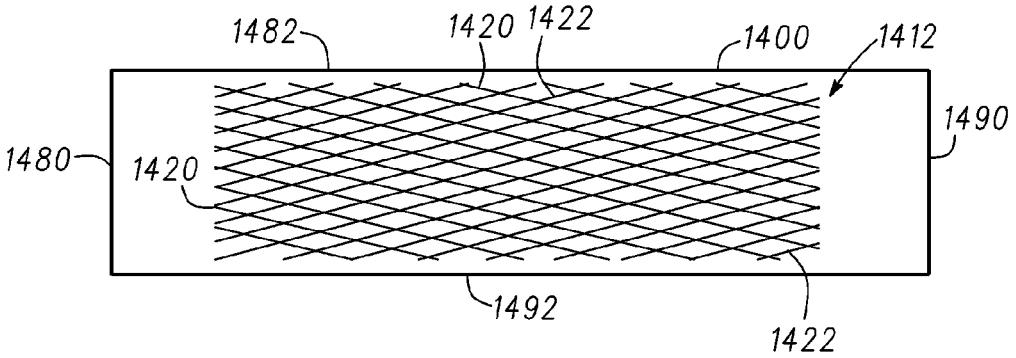
FIG. 52 shows a putter face according to another example.
Figure 53:
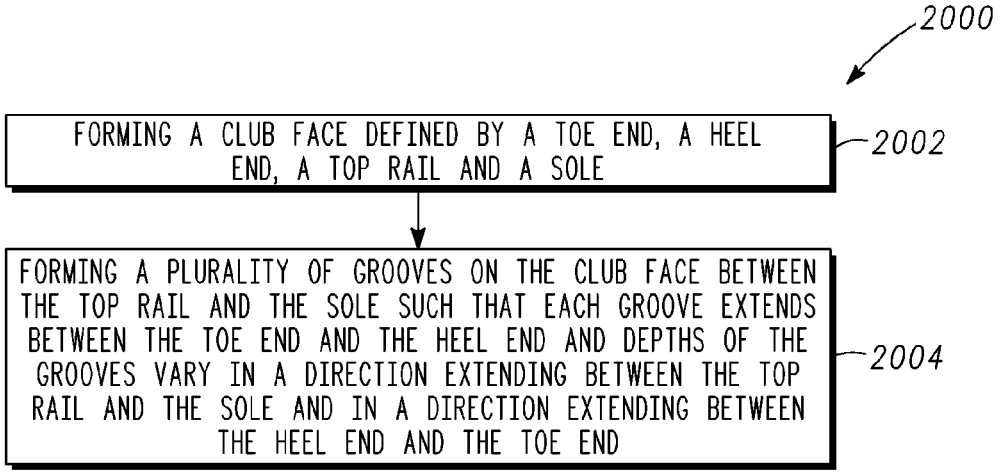
FIG. 53 shows a method of manufacturing a golf club according to one example.

FIGS. 51 and 52 show other examples according to the disclosure. Referring to FIG. 51, a putter head 1300 includes a ball, striking face 1312, which has a plurality of horizontal grooves 1320 and vertical grooves 1322. Each of the grooves 1320 and 1322 may have a different configuration as compared to another groove, such as variable cross-sectional profiles, depth profiles, width profiles, length profiles and/or other groove characteristics from the toe end 1380 to near the heel end 1390 and/or from a top rail 1382 to a sole 1392. For example, the depth of the horizontal grooves 1320 may progressively increase in one or more groove steps from the top rail 1382 to the sole 1386. The apparatus, methods, and articles of manufacture described herein are not limited in this regard.

Referring to FIG. 52, a putter head 1400 includes a halt striking face 1412, which has a plurality of first diagonal grooves 1420 and second diagonal grooves 1422. The first diagonal grooves 1420 may be generally parallel to each other. Similarly, the second diagonal grooves 1422 may be generally parallel to each other. The first diagonal grooves 1420 and the second diagonal grooves 1422 may be transverse to each other as shown in FIG. 52. For example, the first diagonal grooves 1420 may intersect the second diagonal grooves 1422 at an angle of 30°, 45°, 60° or 90°. Each of the grooves 1420 and 1422 may have a different configuration as compared to another groove, such as variable cross-sectional profiles, depth profiles, width profiles, length profiles and/or other groove characteristics from the toe end 1480 to near the heel end 1490 and/or from a top rail 1482 to a sole 1492. For example, the depth of the first diagonal grooves 1420 may progressively increase in one or more groove steps from the top rail 1482 to the sole 1486. The apparatus, methods, and articles of manufacture described herein are not limited in this regard.

Referring to FIG. 52, a process 2000 of manufacturing a golf club head according to one example is shown. The process 2000 includes forming a golf club face (block 2002) defined by a toe end, a heel end, a top rail and a sole. A golf club face may be formed with a golf club head so that the golf club head and the golf club face are a one-piece continuous part. Alternatively, the golf club head and the golf club face may be formed separately. The golf club face may then be attached to the golf club face by using adhesive, tape, welding, soldering, fasteners and/or other suitable methods and devices. The golf club head and/or the golf club face may be manufactured from any material. For example, the golf club head and/or the golf club face may be made from titanium, titanium alloy, other titanium-based materials, steel, aluminum, aluminum alloy, other metals, metal alloys, plastic, wood, composite materials, or other suitable types of materials. The golf club head and/or the golf club face may be formed using various processes such as stamping (i.e., punching using a machine press or a stamping press, blanking, embossing, bending, flanging, or coining, casting, injection molding, forging, machining or a combination thereof, other processes used for manufacturing metal, plastic and/or composite parts, and/or other suitable processes. In one example, when manufacturing a putter head, the material of the putter face and/or the ball striking face may be determined so as to impart a certain ball strike and rolling characteristics to the putter face. In another example, when the ball striking face 212 is separate from the putter face 110 and is inserted and attached into a correspondingly shaped depression on the putter face 110, the striking face 212 may be constructed from a lighter material than the putter face 110 to generally reduce the overall weight of the putter.

According to the process 2000, grooves are formed on the club face and/or club head between the top rail and the sole such that each groove extends between the toe end and the heel end and depths of the grooves vary in a direction extending between the top rail and the sole and in a direction extending between the heel end and the toe end (block 2004). The grooves may be formed using various processes such as casting, forging, machining, spin milled, and/or other suitable processes. The vertical cross-sectional shape of a groove may depend on the method by which a groove is manufactured. For example, the type of cutting bit when machining a groove may determine the vertical cross-sectional shape of the groove. The vertical cross sectional shape of a groove may be symmetric, such as the examples described above, or may be asymmetric (not shown). In one example, the width of a groove can be 0.032 inch, which may be the width of the cutting bit. Accordingly, when machining a groove, the shape and dimensions of the cutting bit may determine the shape and dimension of the groove.

The grooves may be manufactured by spin milling the ball strike face, or stamping or forging the grooves into the ball striking face. The grooves may also be manufactured direction on the putter head to create a ball striking face as described above directly on the putter head. A groove may be manufactured by press forming the groove on the putter head. For example, a press can deform and/or displace material on the putter head to create the groove. A groove may be manufacturing by a milling process where the rotating axis of the milling tool is normal to putter face. The rotating axis of the milling tool may be oriented at an angle other than normal to the putter face. A groove may be manufactured by overlaying one material that is cut clean through to form a through groove onto a base or solid material. A groove may be manufactured by laser and/or thermal etching or eroding of the putter face material. A groove may be manufactured by chemically eroding the putter face material using photo masks. A groove may be manufactured by electro/chemically eroding the putter face material using a chemical mask such as wax or a petrochemical substance. A groove may be manufactured by abrading the face material using air or water as the carry medium of the abrasion material such as sand. Any one or a combination of the methods discussed above can be used to manufacture one or more of the grooves on the putter head. Furthermore, other methods used to create depressions in any material may be used to manufacture the grooves.

As the rules to golf may change from time to time (e.g., new regulations may be adopted or old rules may be eliminated or modified by golf standard organizations and/or governing bodies), golf equipment related to the methods, apparatus, and/or articles of manufacture described herein may be conforming or non-conforming to the rules of golf at any particular time. Accordingly, golf equipment related to the. methods, apparatus, and/or articles of manufacture described herein may be advertised, offered for sale, and/or sold as conforming or non-conforming golf equipment. The methods, apparatus, and/or articles of manufacture described herein are not limited in this regard.

Although a particular order of actions is described above, these actions may be performed in other temporal sequences. For example, two or more actions described above may be performed sequentially, concurrently, or simultaneously. Alternatively, two or more actions may be performed in reversed order. Further, one or more actions described above may not be performed at all. The apparatus, methods, and articles of manufacture described herein are not limited in this regard.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A *putter type* golf club head comprising:

a *putter* club face defined by a toe end, a heel end, a top rail and a sole; [and] *the putter club face is planar and extends in a vertical orientation from a ground plane;* a plurality of grooves disposed on the *putter* club face between the top rail and the sole, each groove extending between the toe end and the heel end;

*wherein each groove comprises a heel portion proximate to the heel end, a toe portion proximate to the toe end, and a center portion extending between the heel portion and the toe portion and including a deepest portion of the groove;* wherein depths of the grooves vary in a direction extending between the top rail and the sole and in a direction extending between the heel end and the toe end;

wherein [a] *the* deepest portion [of at least one groove] is defined by a [generally] planar bottom surface portion of the groove *when viewed in a horizontal cross section extending from the heel end to the toe end; and*

*wherein the center portion includes a change in depth when viewed in the horizontal cross section extending from the heel end to the toe end.*

2. The *putter type* golf club head of claim 1, wherein depths of the grooves increase in a direction from the sole to the top rail.

3. The *putter type* golf club head of claim 1, wherein depths of the grooves increase in a direction from the top rail to the sole.

4. The *putter type* golf club head of claim 1, wherein at least one of a cross sectional configuration of the grooves taken from a section extending from the top rail to the sole or a cross sectional configuration of the grooves taken from a section extending from the heel end to the toe end varies between the top rail and the sole.

5. The *putter type* golf club head of claim 1, wherein the grooves located between a generally center portion of the *putter* club face and the sole have a greater depth than the grooves located between the center portion and the top rail.

6. The *putter type* golf club head of claim 1, wherein the grooves located between a generally center portion of the *putter* club face and the top rail have a greater depth than the grooves located between the center portion and the sole.

7. The *putter type* golf club head of claim 1, further comprising a separate *putter* face portion attached to the *putter* club face, wherein the grooves are located on the *putter* face portion.

8. A *putter type* golf club head comprising:

a *putter* club face defined by a toe end, a heel end, a top rail and a sole; *the putter club face is planar and extends in a vertical orientation from a ground plane;* a plurality of grooves disposed on the *putter* club face, each groove having a heel portion proximate to the heel end and extending toward the toe end, a toe portion proximate to the toe end and extending toward the heel end, and a center portion, extending between the heel portion and the toe portion and including a deepest [part] *portion*, of the groove, a change in depth of each groove between the center portion and the heel portion being greater than a change in depth of the groove along the center portion, and a change in depth of each groove between the center portion and the toe portion being greater than [a] *the* change in depth of the groove along the center portion; [and]

wherein at least one of lengths or depths of the center portions of the plurality of grooves vary between the top rail and the sole;

wherein [a] *the* deepest portion [of at least one groove] is defined by a [generally] planar bottom surface portion of the groove *when viewed in a horizontal cross section extending from the heel end to the toe end; and*

*wherein the change in depth of the groove along the center portion is viewed in the horizontal cross section extending from the heel end to the toe end.*

9. The *putter type* golf club head of claim 8, wherein at least one of the lengths or the depths of the center portions increase in a direction from the sole to the top rail.

10. The *putter type* golf club head of claim 8, wherein at least one of the lengths or the depths of the center portions increase in a direction from the top rail to the sole.

11. The *putter type* golf club head of claim 8, wherein at least one of a cross sectional shape of the grooves taken from a section extending from the top rail to the sole or a cross sectional shape of the grooves taken from a section extending from the heel end to the toe end varies between the top rail and the sole.

12. The *putter type* golf club head of claim 8, wherein the grooves located between a generally center portion of the *putter* club face and the sole are generally deeper than the grooves located between the center portion and the top rail.

13. The *putter type* golf club head of claim 8, wherein the grooves located between a generally center portion of the *putter* club face and the top rail are generally deeper than the grooves located between the center portion and the sole.

14. The *putter type* golf club head of claim 8, further comprising a separate *putter* face portion attached to the *putter* club face, wherein the grooves are located on the *putter* face portion.

15. A method of manufacturing a *putter type* golf club head, the method comprising:

forming a *putter* club face defined by a toe end, a heel end, a top rail and a sole; *the putter club face is planar and extends in a vertical orientation from a ground plane;* forming a plurality of grooves on the *putter* club face between the top rail and the sole such that each groove extends between the toe end and the heel end and depths of the grooves vary in a direction extending between the top rail and the sole and in a direction extending between the heel end and the toe end; [and]

*forming each groove with a heel portion proximate to the heel end, a toe portion proximate to the toe end, and a center portion extending between the heel portion and the toe portion and including a deepest portion of the groove;* forming the plurality of grooves such that [a] *the* deepest portion [of at least one groove] is defined by a [generally] planar bottom surface portion of the groove *when viewed in a horizontal cross section extending from the heel end to the toe end; and*

*forming the center portion includes a change in depth when viewed in the horizontal cross section extending from the heel end to the toe end.*

16. The method of claim 15, wherein forming the plurality of grooves on the *putter* club face comprises forming the plurality of grooves such that depths of the grooves increase in a direction from the sole to the top rail.

17. The method of claim 15, wherein forming the plurality of grooves on the *putter* club face comprises forming the plurality of grooves such that depths of the grooves increase in a direction from the top rail to the sole.

18. The method of claim 15, wherein forming the plurality of grooves on the *putter* club face comprises forming the plurality of grooves such that at least one of a cross sectional configuration of the grooves taken from a section extending from the top rail to the sole or a cross sectional configuration of the grooves taken from a section extending from the heel end to the toe end varies between the top rail and the sole.

19. The method of claim 15, wherein forming the plurality of grooves on the *putter* club face comprises forming the plurality of grooves such that the grooves located between a generally center portion of the *putter* club face and the sole have a greater depth than the grooves located between the center portion and the top rail.

20. The method of claim 15, wherein forming the plurality of grooves on the *putter* club face comprises forming the plurality of grooves such that the grooves located between a generally center portion of the *putter* club face and the top rail have a greater depth than the grooves located between the center portion and the sole.

21. The method of claim 15, further comprising forming a separate *putter* face portion and attaching the *putter* face portion to the *putter* club face, wherein forming the plurality of grooves on the *putter* club face comprises forming the plurality of grooves on the *putter* face portion.

* * * * *